（12) United States Patent
Knutson et al.

(10) Patent No.: US 8,875,963 B2
(45) Date of Patent: Nov. 4, 2014

(54) FISHING ROD HOLDER

(76) Inventors: Curt R. Knutson, Bethlehem, CT (US);
Laura R. Knutson, Bethlehem, CT (US)

( * ) Notice: Subject to any disclaimer, the term of this patent is extended or adjusted under 35 U.S.C. 154(b) by 758 days.

(21) Appl. No.: 12/708,830

(22) Filed: Feb. 19, 2010

(65) Prior Publication Data

US 2011/0204109 A1   Aug. 25, 2011

(51) Int. Cl.
  B60R 9/00 (2006.01)
  B60R 9/08 (2006.01)
  A01K 97/08 (2006.01)

(52) U.S. Cl.
  CPC . *A01K 97/08* (2013.01); *B60R 9/08* (2013.01); Y10S 224/922 (2013.01)
  USPC .......................................... 224/405; 224/922

(58) Field of Classification Search
  CPC ................. Y10S 224/922; B60R 2021/0083; B60R 9/052; B60R 9/00
  USPC .................... 224/323, 405, 922, 402
  See application file for complete search history.

(56) References Cited

U.S. PATENT DOCUMENTS

| | | | |
|---|---|---|---|
| 2,682,982 A * | 7/1954 | Fischer, Jr. ...................... | 224/317 |
| 2,721,680 A | 10/1955 | Steckman | |
| 2,807,398 A * | 9/1957 | Mathews ....................... | 224/317 |
| 3,376,614 A | 4/1968 | Stahl | |
| 3,512,689 A * | 5/1970 | Metropoulos ................. | 224/314 |
| 3,719,297 A * | 3/1973 | Nowicki ....................... | 414/462 |
| 3,848,785 A * | 11/1974 | Bott .............................. | 224/319 |
| 4,063,646 A | 12/1977 | Stahl | |
| 4,424,907 A | 1/1984 | Robb | |
| 4,523,403 A | 6/1985 | Ivy et al. | |
| 4,582,203 A | 4/1986 | Davis | |
| 4,717,055 A * | 1/1988 | San Juan ...................... | 224/405 |
| 4,728,019 A * | 3/1988 | Olliges ......................... | 224/329 |
| 5,094,351 A * | 3/1992 | Barney ......................... | 211/70.8 |
| 5,454,499 A * | 10/1995 | Gibbs ........................... | 224/324 |
| 5,544,797 A | 8/1996 | Silva | |
| 5,560,138 A | 10/1996 | Dentsbier | |
| 5,628,540 A * | 5/1997 | James ........................... | 296/3 |
| 5,803,519 A * | 9/1998 | Daigle .......................... | 294/159 |
| 5,975,819 A * | 11/1999 | Cola ............................. | 410/129 |
| 5,979,102 A | 11/1999 | Sagryn | |
| 6,360,902 B1 | 3/2002 | Searles | |
| 6,460,231 B2 | 10/2002 | Bourgerie | |
| 6,678,991 B2 | 1/2004 | Hooks | |
| 7,331,623 B1 * | 2/2008 | Wall et al. .................... | 296/3 |
| 7,396,046 B2 * | 7/2008 | Cole ............................. | 280/748 |
| 8,668,124 B2 * | 3/2014 | Kennedy et al. .............. | 224/403 |
| 2006/0237501 A1 * | 10/2006 | Gonzalez ...................... | 224/325 |
| 2008/0110948 A1 | 5/2008 | Sutter | |

* cited by examiner

*Primary Examiner* — Brian D Nash
*Assistant Examiner* — John Cogill
(74) *Attorney, Agent, or Firm* — Z IP Law PLLC

(57) ABSTRACT

A holder for transporting one or more fishing rods having first and second parallel rod supports, spaced notches in the top of the first rod support, corresponding spaced openings in the second rod support, a pair of similarly sized clamping bars each pivotally affixed at one end to opposite ends of the first rod support, compression material covering the notches in the first support, a constant support mechanism connecting each clamping bar to the first rod support, and a latch releasably securing the clamping bars to the first rod support. Fishing poles are positioned with the tips in the openings of the second rod support and the handles in corresponding notches in the first rod support, with the clamping bar maintained in an open position at any angle by the constant support mechanism. The clamping bar is closed with the compression material compressing around and securing the handle within the notch, and secured closed with the latch.

14 Claims, 10 Drawing Sheets

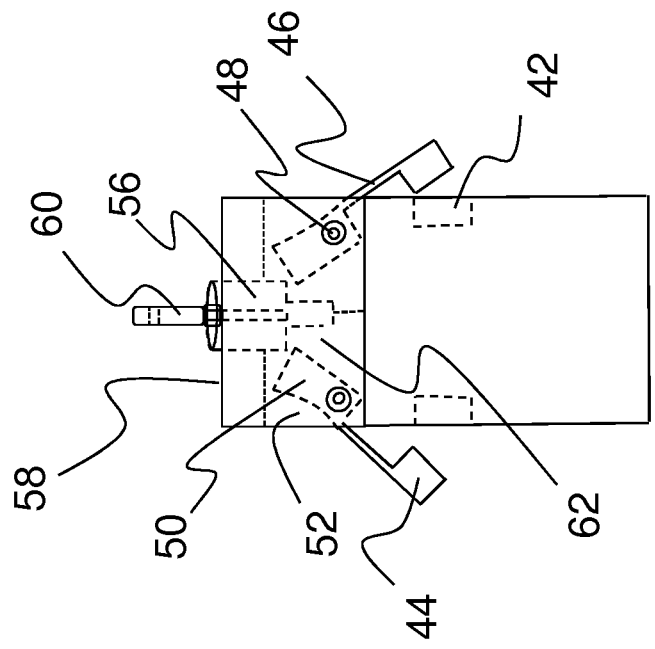
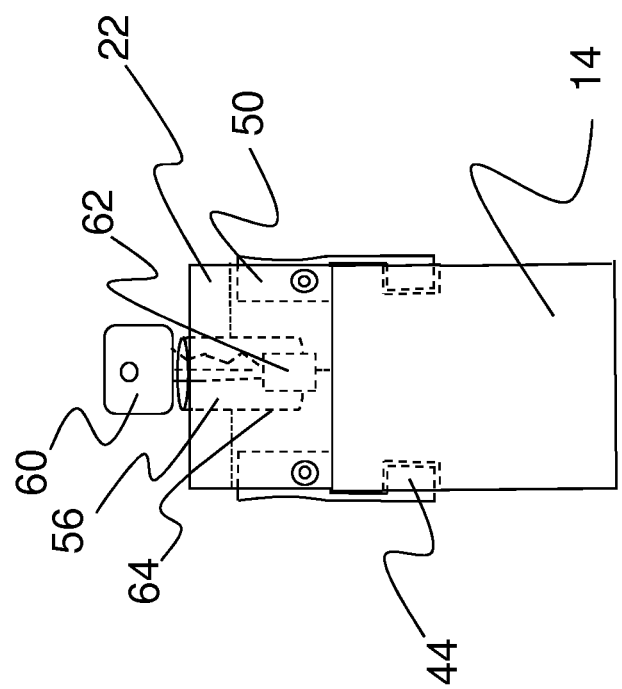
FIG. 7B
FIG. 7A

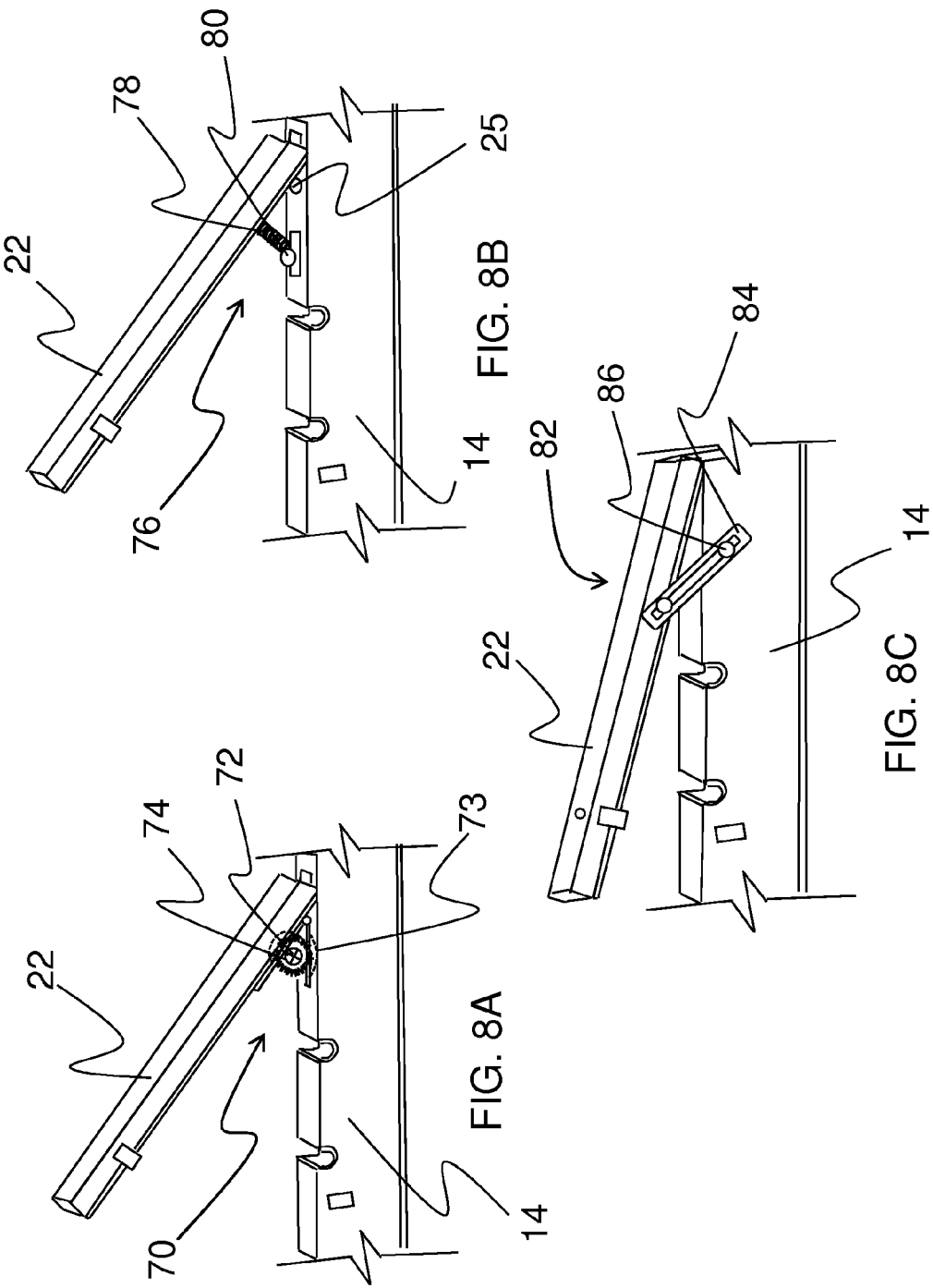

FISHING ROD HOLDER

FIELD OF THE INVENTION

The present invention relates to rack systems for securing elongated objects during transport, and more particularly, to a holder for safely transporting fishing rods in a vehicle such as in the bed of a pickup truck.

BACKGROUND OF THE INVENTION

The transport and storage of fishing rods is problematic because of their length, flexibility and unbalanced weight. Fishing rods and reels are also expensive, particularly saltwater deep sea rods and reels can cost thousands of dollars and can be easily damaged and the lines and hooks prone to entanglement, particularly if multiple fishing rods are transported together. As many people use pickup trucks to transport fishing gear, security and space is also a concern, as such expensive rods are easy targets for thieves and economizing storage space in the bed of the truck is important where a substantial amount of gear must be stored.

Accordingly, there is a need for providing a lockable fishing rod holder for transporting multiple fishing rods in a secure arrangement in the bed of a pickup truck.

SUMMARY OF THE INVENTION

The invention relates to a method and apparatus for securely transporting a number of elongated objects such as fishing poles. The invention includes a lockable rack system adapted to fit in the bed of a pickup truck and which separately holds a plurality of fishing rods in a raised, horizontal position for ease of access, for example, through the back window of a pickup cab.

It is an object of the present invention to provide a fishing rod holder for transporting a number of fishing rods securely and separately.

It is another object of the present invention to provide a fishing rod holder which supports the fishing rods in a raised position in the back of a pickup truck.

It is a further object of the present invention to provide a fishing rod holder which grips the fishing rod handles securely without causing damage.

It is another object of the invention to provide a fishing rod holder having a clamping bar which can be maintained in a raised position without being held by a user.

It is a further object of the present invention is to provide a fishing rod holder which can be locked in order to prevent theft.

It is yet another object of the invention to provide a fishing rod holder having two clamping bars, each spanning about half the length of the handle support.

These objects are accomplished generally by a holder having first and second parallel rod supports with spaced notches in the top of the first rod support and corresponding spaced openings in the second rod support. A clamping bar is pivotally affixed at one end to a first rod support, with a compression material covering the notches in the first support to compress around and secure the fishing rod handles in the notches. A bias mechanism allows positioning of the clamping bar at any angle to the first support mechanism and the position is maintained with the clamping bar in a raised, open position until the position is released. The clamping bar is secured to the first rod support using a locking mechanism providing for safe storage of the fishing rods.

In use, fishing poles are positioned with the tips in the openings of the second rod support and the handles in corresponding notches in the first rod support. The raised position allows the fishing rods to be readily accessed through a rear cab window without reaching or leaning, and leaves room underneath for storage of other items such as ice chests and tackle boxes.

The present invention is directed to a fishing rod holder for use in the bed of a pickup truck comprising, a first support member having a plurality of notches, a second support member having plurality of openings, the openings equal in number and spacing to the notches in the first support member, a clamping bar pivotally affixed to the first support member, a bias mechanism that raises the clamping bar and holds it in place at any angle from the first support member, and wherein the first support member aligned in parallel with the second support member supports a plurality of fishing rods.

The present invention is also directed to a method of storing a plurality of fishing rods, comprising the steps of, attaching a first support across the frame of a pickup truck, the first support having notches and a cross member supported by a bias mechanism, attaching a second support across the frame of a pickup truck, the second support having openings matching the notches of the first support, raising the cross member to any angle above the first support, the cross member being held in position at any angle by the bias mechanism, inserting a tip of a fishing rod through the opening of the second support, resting a handle of the fishing rod in the notch of the first support; and lowering the cross member.

These and other features, advantages and improvements according to this invention will be better understood by reference to the following detailed description and accompanying drawings.

BRIEF DESCRIPTION OF THE DRAWINGS

Several embodiments of the present invention will now be described by way of example only, with reference to the accompanying drawings.

FIGS. 7A-7C are perspective views of an embodiment of the locking mechanism of the present invention.

FIGS. 8A-8C are perspective view of embodiments of the bias mechanism of the present invention.

DETAILED DESCRIPTION OF THE INVENTION

Figure 1:
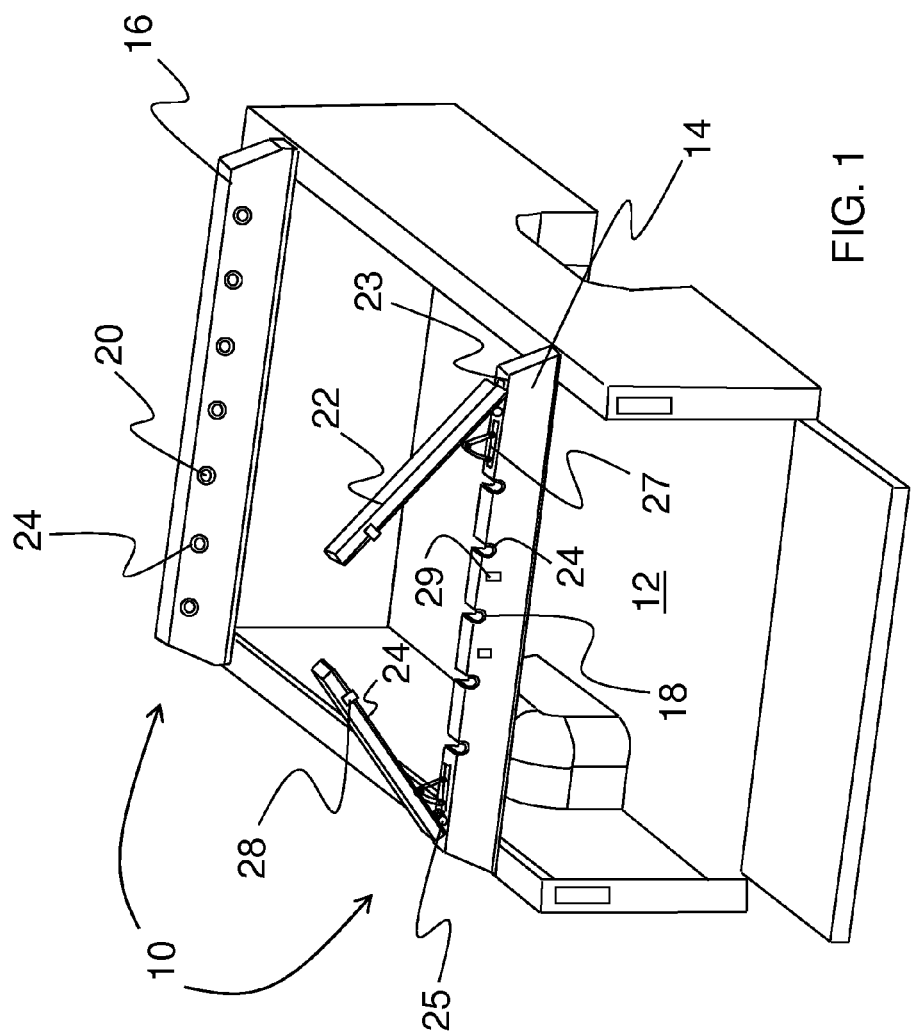
FIG. 1 is a perspective view of an embodiment of the fishing rod holder of the present invention in the bed of a pickup truck showing the clamping bars maintained in a raised position.

The invention as shown in FIG. 1 is a fishing rod holder 10 in the bed of a pickup truck 12 having a first generally horizontal support member 14, a second support 16 generally parallel to the first support member 14, a plurality of rounded spaced notches 18 in an upper surface of the first support member 14, and a plurality of spaced openings 20 in the second support member 16, with the openings 20 in the second support member 16 equal in number and spacing to the notches 18 in the first support 14. A pair of cross-members or clamping bars 22 are pivotally attached at each distal end 23 of the first support member 14. The clamping bars 22 may be pivotally attached using a hinge 25. The clamping bar 22 is then supported by a bias mechanism 27 that allows the clamping bar 22 to be raised to an open position above the support member 14. In a closed position the clamping bar 22 aligns along a portion of the support member 14 covering the notch openings 18. The bias mechanism 27 maintains the clamping bar 22 in a raised position. FIG. 1 illustrates an embodiment of the invention wherein the bias mechanism 27 is a frictional sliding bracket which acts to prop the clamping bars 22 upward. The bias mechanism 27 allows a user to place fishing rods 26 (not shown) in the fishing rod holder 10, and to remove the fishing rods 26 for use, without having to manually hold up the clamping bar 22. The clamping bar 22 is held by the bias mechanism in a raised position at any angle above the first rod support 14. Also shown in FIG. 1 is a latch 28 and latch receptacle 29 for releasably securing each clamping bar 22 to the first support 14.

Figure 2:
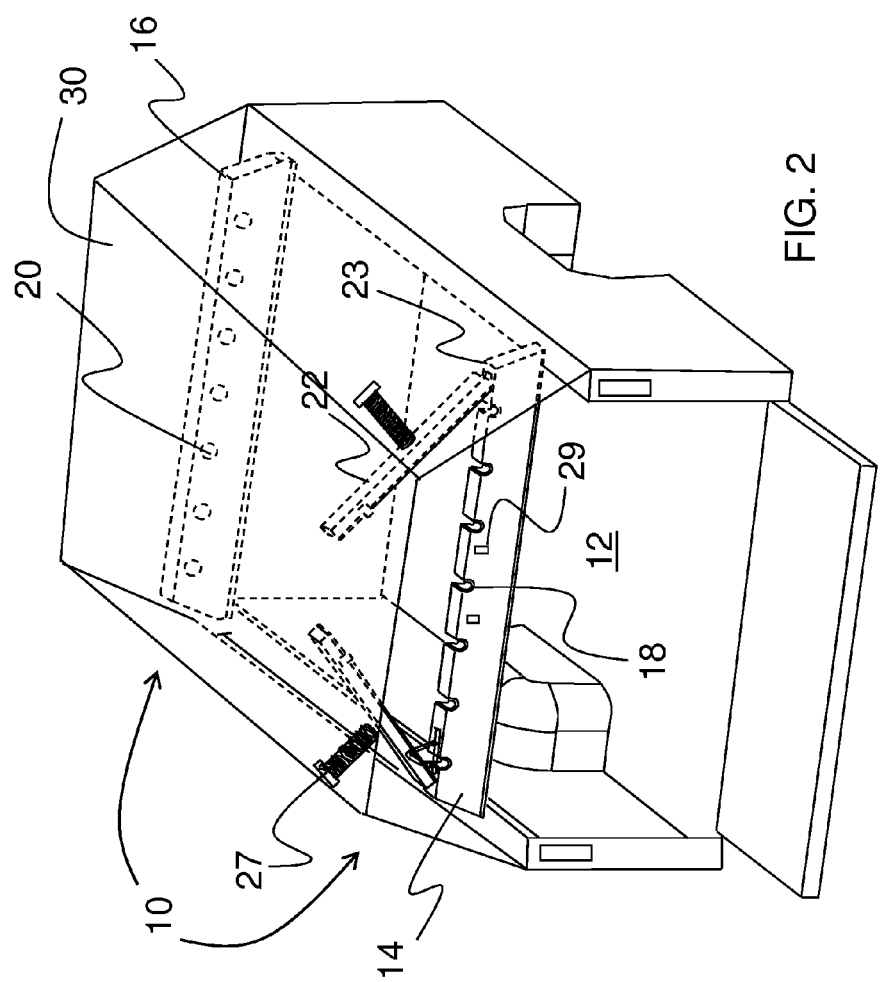
FIG. 2 is a perspective view of an embodiment of the fishing rod holder of the present invention in the bed of a pickup truck that has a cab cover, the clamping bars maintained in a raised position.

The fishing rod holder 10 of the invention may have a single clamping bar which spans substantially the entire length of the first support 14. When the fishing pole holder 10 is in the bed of a pickup truck 12 having a cab 30 as shown in FIG. 2, however, a single clamping bar may be restricted in its upward movement by the roof of the cab 30. Preferably, the fishing rod holder 10 includes a pair of clamping bars 22, each of which spans roughly half the length of the first support 14, and is pivotally affixed at one end to an end of the first support 14. In this embodiment the bias mechanism 27 is a spring that is suspended from the cab 30 and attached to the clamping bar 22 to hold the clamping bar 22 in a raised position at any angle to allow a user's hands to be free to insert or remove a fishing rod 26 from the fishing rod holder 10.

Figure 3:
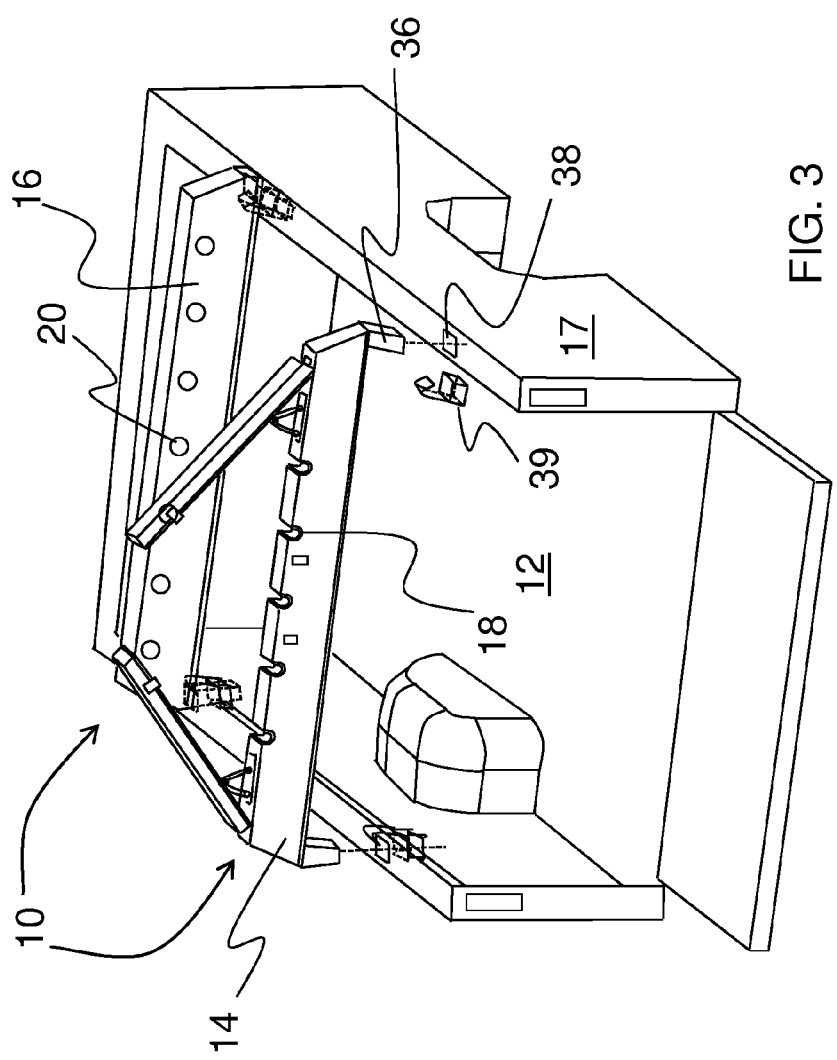
FIG. 3 is a perspective view of an embodiment of the fishing rod holder of the present invention being installed in the bed of a pickup truck.

The first and second supports 14, 16 of the fishing rod holder 10 may be provided with a base extension 36 that is inserted through a mounting hole 38 in the frame of the pickup truck 17 as shown in FIG. 3. The base extension 36 may then be bolted, or secured in some other manner to the frame 17. In one embodiment, the base extension 36 may be inserted through the mounting hole 38 and then be inserted into a j-type bracket 39 that would clamp onto the edge of the mounting hole 38 and be suspended from the frame 17 to secure the fishing holder support 14, 16 in a vertical position. Each support is secured in a mounting hole 38 on each side of the pickup frame 17 so that the support spans across the bed 12 of the pickup truck with the first support 14 being positioned at a mounting hole 38 location closer to the rear of the pickup truck and the second support 16 being positioned at a mounting hole 38 closer to the front of the pickup truck.

Figure 4:
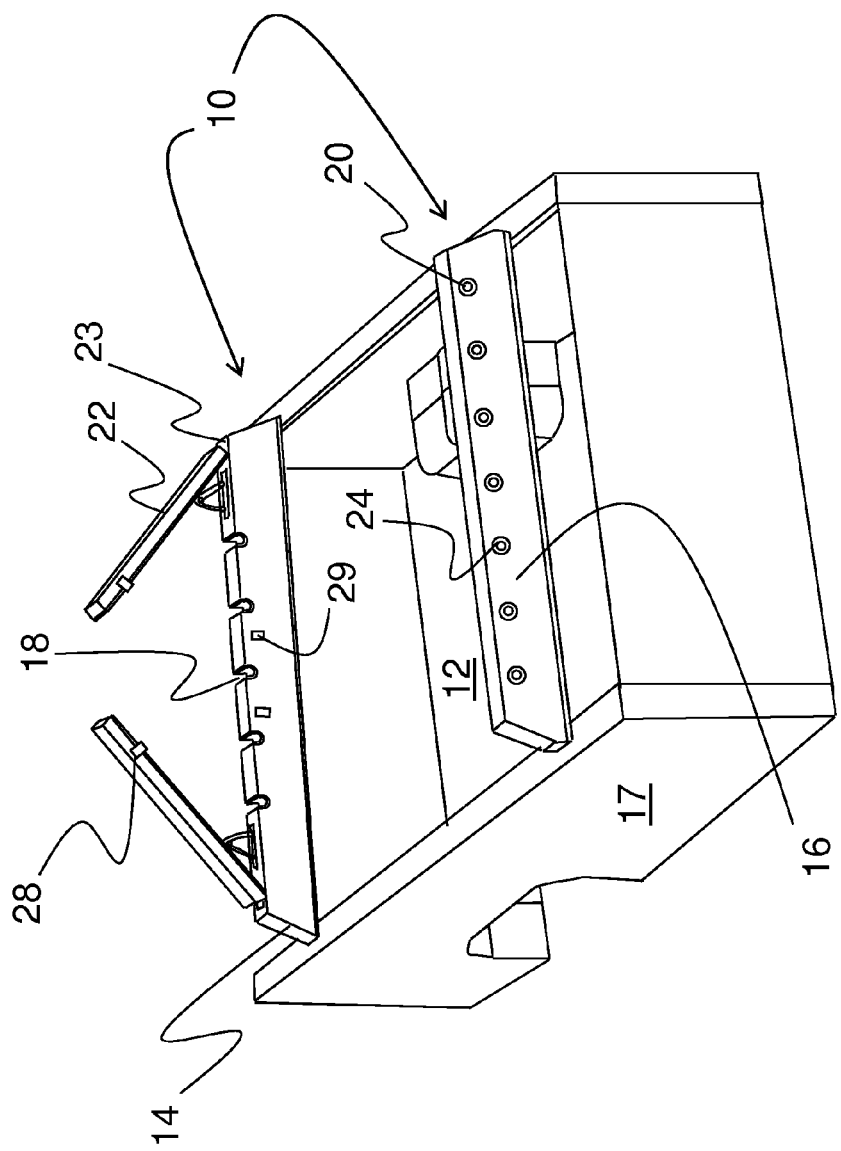
FIG. 4 is a perspective view of the fishing rod holder of the present invention from the front of the bed of the pickup truck.

The distance between each support may be of any length that accommodates the length of the bed of the pickup truck 12 and the length of one or more fishing rods 26. FIG. 4 shows the bed 12 of the pickup truck from the front of the vehicle with the second support 16 positioned closest to the front of the vehicle. Each notch 18 of the first support 14, the underside of the clamping bar 22 and each opening 20 of the second rod support 16 is lined with foam compression material 24 to protect an inserted fishing rod from scratches or damage. Alternatively, the openings 20 of the second rod support 16 may be rounded notches on the surface of the second rod support 16 that may be lined with foam compression material 24.

The fishing rod holder 10 of the invention is preferably secured in the back of a pickup truck 12 with the first and second rod supports 14, 16 generally parallel to the tailgate of the pickup truck 12. For convenience, the first rod support 14, which holds the handle 32 of the fishing rod 26, is nearer the tailgate of the pickup truck 12 than the second rod support 16. With the fishing rods 26 held in a raised position by the fishing rod holder 10, a user can access the fishing rods 26 through a back window of the cab 30 without reaching or leaning. Additionally, this orientation leaves the floor of the pickup truck bed 12 unencumbered so that other items, for example, coolers, ice chests, tackle and tool boxes can be stored thereon.

Figure 5:
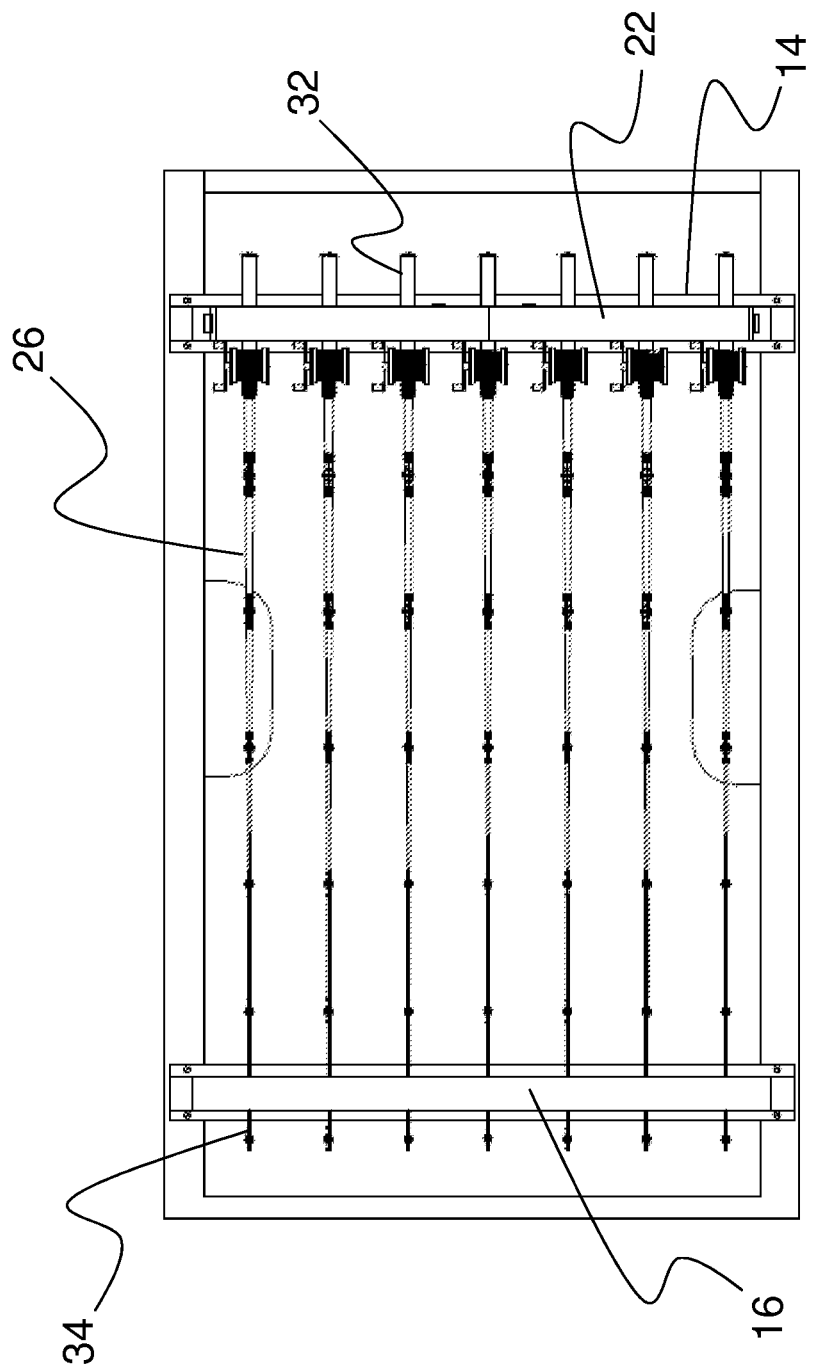
FIG. 5 is a top view of an embodiment of the fishing rod holder of the present invention holding a plurality of fishing rods.

A top view of the fishing rod holder 10 of the present invention having a plurality of fishing rods 26 that extend from the first support 14 at the rear of the pickup truck to the second support 16 nearer to the front of the pickup truck is shown in FIG. 5. The handles 32 of the fishing rods 26 are secured to the first rod support 14 by the clamping bars 22, while the tips 34 reside within the openings of the second rod support 16. The second rod support 16 may be positioned to support the fishing rods 26 near the tip top (terminus) of the fishing rod 26, or alternatively the second rod support 16 may be positioned in a mounting hole 38 of the frame 17 of the pickup truck in a more central location. In this way the tip 34 of the fishing rod 26 would be supported closer to the middle of the rod 26, as would be preferred for more flexible fishing rods. Accordingly, the term "tip" as used herein is intended to include all portions of the rod beyond the handle 32 and reel, including the butt.

Figure 6A:
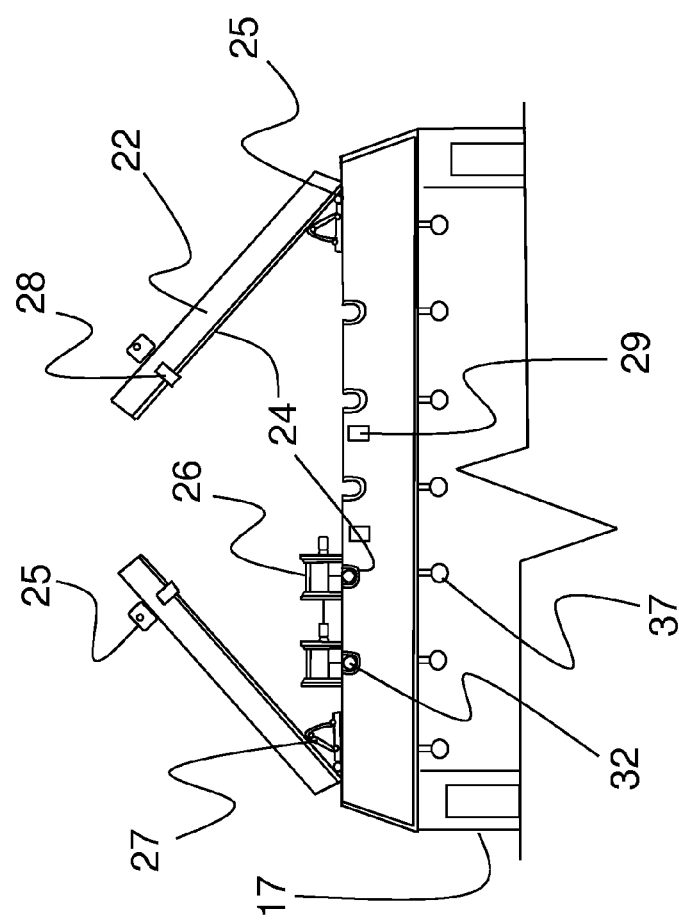
FIG. 6A is a rear view of an embodiment of the fishing rod holder of the present invention holding two fishing rods with the clamping bars in a raised, open position.

As shown in FIG. 6A, to use the fishing rod holder 10 of the invention, a user pivots a clamping bar 22 to a raised position, with the clamping bar 22 maintained in the raised position by the bias mechanism 27. The bias mechanism 27 of the clamping bar 22 allows the clamping bar 22 to be raised to any angle from the first rod support 14, and the clamping bar 22 will be held in that position by the bias mechanism 27 until it is released. With the clamping bar 22 raised to a desired positioned, the tip of a fishing rod 26 may be inserted through one of the openings 20 in the second rod support 16. The handle 32 of the fishing rod 26 may then be positioned into a corresponding notch 18 in the first rod support 14. The clamping bar 22 may then be lowered to secure the fishing rod 26 in the fishing rod holder 10 as shown in FIG. 6B.

In order to accommodate fishing rods 26 having handles of various sizes, and also to protect the handles from damage, the notches 18 in the first rod support 14 are preferably covered with a compression material which deforms around and secures the fishing rod handles 32 between the first rod support 14 and the clamping bar 22. The compression material 24 can be a soft fabric such as felt or cloth, or a synthetic material such as closed cell foam. Optionally, the top surface of the first rod support 14, the bottom surface of the clamping bar 22 and openings 20 in the second rod support 16 can also be covered with a compression material in order to protect the fishing rod tips from damage. Also shown in FIGS. 6A and 6B are optional utility rings 37 affixed to a bottom portion of the second support 16.

Figure 6B:
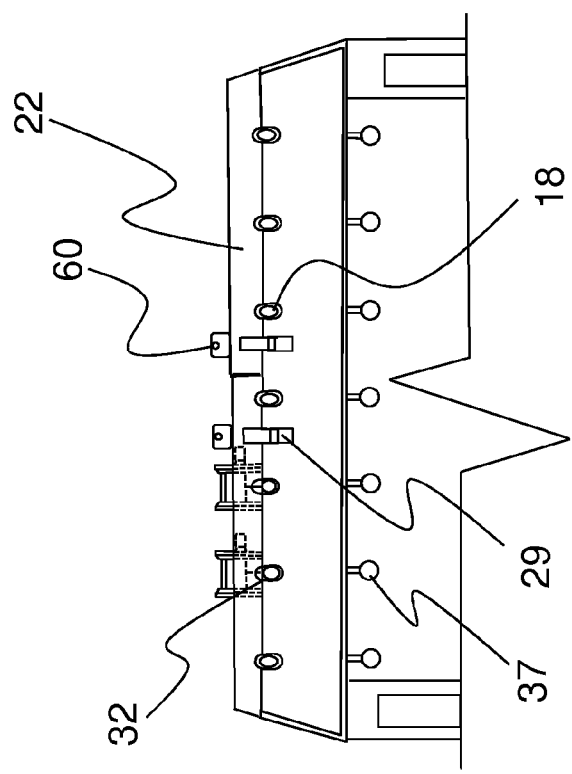
FIG. 6B is a rear view of an embodiment of the fishing rod holder of the present invention holding two fishing rods with the clamping bars in a lowered, closed position.

In pivoting the clamping bar 22 down to a lowered position as shown in FIG. 6B the bias mechanism 27 releases the positional hold on the clamping bar 22. The positional hold may be overcome simply by a minimal amount of force on the bias mechanism 27 or there may be a quick release control that is manipulated to safely release the clamping bar 22 and allow it to be lowered to the first rod support 14. The clamping bar 22 is then secured to the first support 14 in the lowered position with the latch 28, which can be mated with the latch receptacle 29 and then optionally be locked using a key 60, padlock or other method to safely store and protect the fishing rods 26 from theft.

Figure 7C:
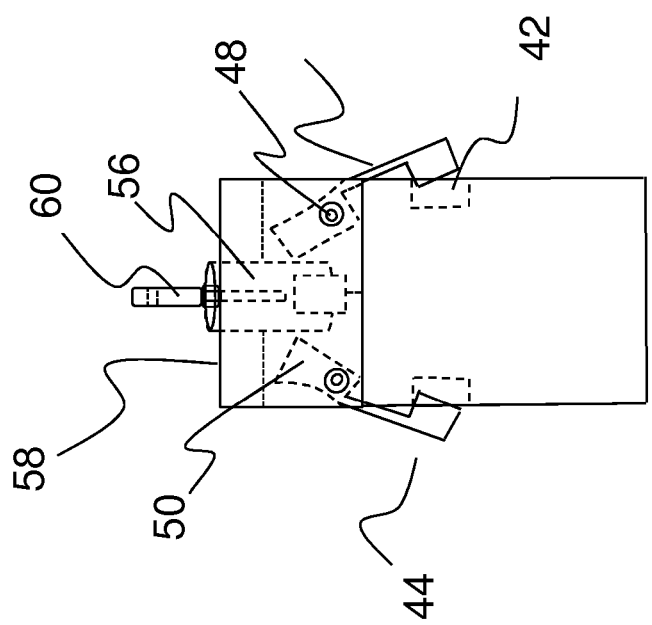

In one embodiment, a locking mechanism with key 60 is employed as shown in FIGS. 7A-7C. In this embodiment as shown in FIG. 7A, the latch receptacle 29 of the first rod support 14 is a cutout or indent 42 that corresponds with a headpiece or protrusion 44 of an extension arm 46. The extension arm 46 pivots about a pin insert 48 and the base 50 of the extension arm 46 is partially positioned within a recess 52 in the clamping bar 22. Also recessed within the clamping bar 22 is locking barrel 56 that extends from the top 58 of the clamping bar 22 to a position below the top of the base 50 of the extension arm 46. The locking barrel 56 is turned with the use of a key 60 to an open position and a locked position. In an open position, as shown in FIG. 7B, when the base 50 of the extension arm 46 is compressed it slides into a space 62 in the locking barrel 56 allowing the headpiece 44 of the extension arm 46 to not be obstructed by the cutout 42 of the latch receptacle 29. The clamping bar 22 can then be raised away from the first rod support 14. In a locked position as shown in FIG. 7C, the space 62 in the locking barrel 56 is turned away from the base 50 of the extension arm 46. The base 50 is then obstructed by the edge 64 of the locking barrel 56 and the headpiece 44 of the extension arm 46 is obstructed by the indent 42 of the latch receptacle 29 and the clamping bar 22 cannot be pulled away from the first rod support 14. In the locked position, the key 60 may be removed from the locking barrel 56 securing the clamping bar 22 to the first rod support 14 for storage to prevent the theft of the fishing rods 26.

In one embodiment as shown in FIG. 2 the clamping bars 22 maintained in a raised position by springs 27 which connect the clamping bars 22 to an upper interior surface of the pickup truck cab 30. The bias mechanism 27 may be alternatively be a frictional sliding bracket as shown above or other optional support mechanisms as shown in FIGS. 8A-8C. In FIG. 8A a ratchet mechanism 70 that uses teeth 72 to secure the mechanism in any raised position and the release the position by pressing a release latch 74 is shown. The ratchet mechanism 70 may inserted in a recess 73 of the clamping bar 22 or the first support 14 or may be mounted on the side of the clamping bar 22 to allow full closure of the clamping bar 22 on the first support 14. Alternatively a spring hinge 76 as shown in FIG. 8B using a spring 78 and quick release mechanism 80 can be used to connect the clamping bars 22 to the first rod support 14. This mechanism will urge the clamping bars 22 upward to maintain them in any raised position. Another preferred alternative as shown in FIG. 8C is a constant support mechanism connecting the clamping bars 22 to the first support 14. The constant support mechanism 82, such as a bolt and sliding assembly 84, does not urge the clamping bars 22 either up or down, but will frictionally maintain them in any position desired by the user. An adjustable knob 86 may allow for increased tightness of the constant support mechanism in the raised position.

The present invention is directed to A fishing rod holder for use in the bed of a pickup truck comprising, a first support member having a plurality of notches, a second support member having plurality of openings, the openings equal in number and spacing to the notches in the first support member, a clamping bar pivotally affixed to the first support member, a bias mechanism that raises the clamping bar and holds it in place at an angle from the first support member, and wherein the first support member aligned in parallel with the second support member to support a plurality of fishing rods.

The present invention is also directed to a method of storing a plurality of fishing rods, comprising the steps of, attaching a first support across a bed of a pickup truck, the first support having notches and at least a first clamping bar supported by a hinge mechanism, attaching a second support parallel to the first support across the frame of a pickup truck, the second support having openings linearly aligned with the notches of the first support, raising the clamping bar to any angle above the first support, the cross member being held in position by the bias mechanism, inserting a tip of a fishing rod into the opening of the second support, and resting a handle of the fishing rod in the notch of the first support and lowering the clamping bar to secure the fish rod.

The present invention is further directed to a securing rack for elongate objects comprising, a first generally horizontal support, a second support generally parallel to the first support, a plurality of spaced notches in an upper side of the first support, a plurality of spaced openings in the second support, the openings equal in number and spacing to the notches in the first support, a pair of similarly sized clamping bars pivotally affixed at one end to opposite distal ends of the first support, a mechanism for maintaining the clamping bars in a raised position at any angle to the first support, and wherein an elongate object is inserted through the opening of the second support and cradled in the notch of the first support and the clamping bars are lowered.

Since certain changes may be made in the above-described invention, without departing from the spirit and scope of the invention herein involved, it is intended that all of the subject matter of the above description or shown in the accompanying drawings shall be interpreted merely as examples illustrating the inventive concept herein and shall not be construed as limiting the invention.

PARTS LIST

10 Fishing Rod Holder
12 pickup truck bed
14 first rod support
16 second rod support
17 pickup truck frame
18 notches in 14
20 openings in 16
22 clamping bar
23 distal end of first rod support
24 compression foam
25 hinge
26 fishing rod
27 bias mechanism
28 latch
29 latch receptacle
30 cab of 12
32 handle of 26
34 tip of 26
36 base extension
37 utility rings
38 mounting hole in 17
39 j-type bracket
42 indent in 29
44 protrusion in 46
46 extension arm
48 pin insert
50 base
52 recess in 22
56 locking barrel 58 top of clamping bar
60 key
62 space in 56
70 ratchet mechanism
72 teeth
73 bias mechanism recess in 14 and 22
74 release latch
76 spring hinge
78 spring
80 quick release mechanism
82 constant support mechanism
84 frictional sliding bracket
86 adjustable knob

We claim:

1. A fishing rod holder in combination with a pickup truck bed comprising:
   a pickup truck comprising a bed with sidewalls having top edges;
   a first support member having a plurality of notches and at least one base extension extending from a first sidewall of the pickup truck bed to a second sidewall;
   a second support member having a plurality of openings, the openings equal in number and spacing to the notches in the first support member and the second support member having at least one base extension also extending across the pickup truck bed from the first sidewall to the second sidewall;
   at least a clamping bar pivotally affixed to the first support member;
   a bias mechanism that raises the clamping bar and holds it in place at an angle from the first support member;
   the first support member aligned in parallel with the second support member to support a plurality of fishing rods; and
   wherein each opening in the second support member comprises;
   a first and a second aperture connected by a substantially circular passage;
   a compressive foam material contiguously lining the circular passage, and each opening and circular passage is entirely surrounded by solid material with the only entrance and exit into each opening occurring via the first and second aperture and wherein a tip of a fishing rod may be entirely circumferentially secured in the second support member and removal of the fishing rod from the fishing rod holder occurs by releasing solely the clamping bar on the first support member; and
   wherein base extensions of the first and second support members are inserted through a mounting hole and an opening in a bracket that is clamped to and suspended from the mounting hole securing the first and second support members on a respective top edge of the first and second sidewalls of the pickup truck bed defining a storage space below the first and second support members.

2. The fishing rod holder for use in the bed of a pickup truck of claim 1, further comprising a second clamping bar, the first and second clamping bars each pivotally affixed to the first support member.

3. The fishing rod holder for use in the bed of a pickup truck of claim 2, wherein at least one of the first and second clamping bars is raised to a variable angular position relative to the first support member where it is fixedly held at the variable angular position by the bias mechanism.

4. The fishing rod holder for use in the bed of a pickup truck of claim 3, wherein the variable angular position of the at least first and second clamping bars is changed by manual force.

5. The fishing rod holder for use in the bed of a pickup truck of claim 4, wherein an end of each of the first and second clamping bars are secured and released to the support member by a manual release mechanism.

6. The fishing rod holder for use in the bed of a pickup truck of claim 5, wherein the first and second clamping bars have a lowered position where the clamping bar is secured to the first support member using a locking mechanism.

7. The fishing rod holder of claim 6, wherein at least one of the first and second clamping bars and the first support member defines a flexible cushioning surface for engaging a fishing rod in the rod holder.

8. The fishing rod holder of claim 5, wherein the first and second clamping bars are attached at respective first ends to the distal ends of the first support member by a pivot and the manual release mechanism for each clamping bar are located adjacent one another along a central portion of the first support member.

9. The fishing rod holder for use in the bed of a pickup truck of claim 1, wherein the first and second support members are mounted entirely across the bed of the pickup truck.

10. A securing rack for elongate objects in a bed of combination with a pickup truck, the rack comprising:
    a pickup truck comprising a bed with sidewalls having top edges;
    a first generally horizontal support extending from a first sidewall of the pickup truck bed to a second sidewall;
    a second support generally parallel to the first support and the second support member also extending across the pickup truck bed between the first sidewall and the second sidewall;
    at least one base extension and a plurality of spaced notches in an upper side of the first support;
    at least one base extension and a plurality of spaced openings in the second support, the openings equal in number and spacing to the notches in the first support;
    a pair of similarly sized clamping bars pivotally affixed at one end to opposite distal ends of the first support;
    a mechanism for maintaining the clamping bars in a raised position at any angle to the first support; and
    wherein an elongate object is inserted through the opening of the second support and cradled in the notch of the first support and the clamping bars are lowered;
    wherein each opening in the second support member comprises;
    a first and a second aperture connected by a substantially circular passage;
    a compressive foam material contiguously lining the circular passage, and each opening and circular passage is entirely surrounded by solid material with the only entrance and exit into each opening occurring via the first and second aperture and wherein a tip of a fishing rod may be entirely circumferentially secured in the second support member and removal of the fishing rod from the fishing rod holder occurs by releasing solely the clamping bar on the first support member; and
    wherein base extensions of the first and second support members are inserted through a mounting hole and through a j-type bracket that is clamped onto the side of the mounting hole and suspended from the mounting hole securing the first and second support members on a respective top edge of the first and second sidewalls of the pickup truck bed defining a storage space below the first and second support members.

11. The securing rack for elongate objects of claim 10, wherein the rack is secured in the back of a pickup truck with the first and second supports generally parallel to a tailgate of the pickup truck and the first support nearer the tailgate than the second support.

12. The securing rack for elongate objects of claim 11, further comprising a releasable locking mechanism at one end of the clamping bars and a pivot at the opposing end to secure the clamping bars to the first support.

13. The securing rack for elongate objects of claim 12 wherein the mechanism for maintaining the clamping bars in a raised position at any angle to the first support is one of a frictional sliding bracket, a ratchet mechanism, a spring hinge, a bolt and slide assembly, or springs suspended from the upper interior of a truck cab.

14. A fishing rod holder in combination with a pickup truck bed comprising:
- a first support member having a plurality of notches and at least one base extension extending from a first sidewall of the pickup truck bed to a second sidewall;
- a second support member having plurality of openings and at least one base extension, the openings equal in number and spacing to the notches in the first support member and the second support member also extending across the pickup truck bed from the first sidewall to the second sidewall;
- at least a clamping bar pivotally affixed to the first support member;
- a bias mechanism that raises the clamping bar and holds it in place at an angle from the first support member; and
- wherein the first support member aligned in parallel with the second support member to support a plurality of fishing rods; and
- wherein each opening in the second support member comprises;
- a first and a second aperture connected by a substantially circular passage;
- a compressive foam material contiguously lining the circular passage, and each opening and circular passage is entirely surrounded by solid material with the only entrance and exit into each opening occurring via the first and second aperture so that a tip of each of the plurality of fishing rods may be entirely circumferentially secured in the second support member without a moveable or clamping member on the second support member and removal of each of the plurality of fishing rods from the fishing rod holder occurs by releasing solely the clamping bar on the first support member;
- a base extension of the first and second support members are inserted through a mounting hole and through a j-type bracket that is clamped onto the side of the mounting hole, the j-type bracket being suspended from the mounting hole for securing the first and second support members on a respective top edge of the first and second sidewalls of the pickup truck bed defining a storage space below the first and second support members;
- the at least one clamping bar includes a second clamping bar, the first and second clamping bars each pivotally affixed to the first support member;
- at least one of the first and second clamping bars is raised to a variable angular position relative to the first support member where it is fixedly held at the variable angular position by the bias mechanism and the variable angular position of the at least first and second clamping bars is changed by manual force, and an end of each of the first and second clamping bars are secured and released to the support member by a manual release mechanism; and
- wherein the first and second clamping bars are attached at respective first ends to the distal ends of the first support member by a pivot and the manual release mechanism for each clamping bar are located adjacent one another along a central portion of the first support member.

* * * * *